United States Patent
Mair et al.

(10) Patent No.: US 10,275,010 B2
(45) Date of Patent: Apr. 30, 2019

(54) FAST AND AUTONOMOUS MECHANISM FOR CPU OC PROTECTION

(71) Applicants: MediaTek Singapore Pte. Ltd., Singapore (SG); Hugh Thomas Mair, Fairview, TX (US); Sumanth Katte Gururajarao, Dallas, TX (US); Gordon Gammie, Austin, TX (US); Alice Wang, Allen, TX (US); Uming Ko, Houston, TX (US); Rolf Lagerquist, Lakeway, TX (US)

(72) Inventors: Hugh Thomas Mair, Fairview, TX (US); Sumanth Katte Gururajarao, Dallas, TX (US); Gordon Gammie, Austin, TX (US); Alice Wang, Allen, TX (US); Uming Ko, Houston, TX (US); Rolf Lagerquist, Lakeway, TX (US)

(73) Assignee: MediaTek Singapore Pte. Ltd., Singapore (SG)

( * ) Notice: Subject to any disclaimer, the term of this patent is extended or adjusted under 35 U.S.C. 154(b) by 205 days.

(21) Appl. No.: 15/119,731

(22) PCT Filed: Feb. 16, 2015

(86) PCT No.: PCT/US2015/016071
§ 371 (c)(1),
(2) Date: Aug. 18, 2016

(87) PCT Pub. No.: WO2015/126790
PCT Pub. Date: Aug. 27, 2015

(65) Prior Publication Data
US 2017/0068296 A1    Mar. 9, 2017

Related U.S. Application Data

(60) Provisional application No. 61/942,808, filed on Feb. 21, 2014.

(51) Int. Cl.
*G06F 1/32*       (2019.01)
*G06F 1/324*      (2019.01)
(Continued)

(52) U.S. Cl.
CPC ............ *G06F 1/324* (2013.01); *G06F 1/28* (2013.01); *G06F 1/3206* (2013.01);
(Continued)

(58) Field of Classification Search
CPC .............. G06F 1/32; G06F 1/26; G06F 1/28
(Continued)

(56) References Cited

U.S. PATENT DOCUMENTS 6,515,530 B1    2/2003 Boerstler
2002/0026597 A1    2/2002 Dai
(Continued)

FOREIGN PATENT DOCUMENTS

CN    101101504 A    1/2008
CN    101526845 A    9/2009

OTHER PUBLICATIONS

"International Search Report" dated May 18, 2015 for International application No. PCT/US15/16071, International filing date:Feb. 16, 2015.

*Primary Examiner* — Jaweed A Abbaszadeh
*Assistant Examiner* — Keshab R Pandey
(74) *Attorney, Agent, or Firm* — Tong J. Lee (57) ABSTRACT

A method of detecting and preventing over current induced system failure is provided. An OC protect controller monitors a CPU total power consumption based on received CPU activity information. In response to the monitoring, if the CPU power consumption is over a threshold, then the OC protect controller outputs a frequency dithering control signal to reduce the CPU clock frequency such that the CPU does not reach an OC limit. The OC protect controller also
(Continued)

outputs a PLL frequency control signal to reduce the PLL clock frequency to improve system efficiency.

20 Claims, 5 Drawing Sheets (51) Int. Cl.
*G06F 1/28* (2006.01)
*G06F 1/3206* (2019.01)
*G06F 1/3296* (2019.01)

(52) U.S. Cl.
CPC .......... *G06F 1/3296* (2013.01); *Y02D 10/126* (2018.01); *Y02D 10/172* (2018.01)

(58) Field of Classification Search
USPC ........ 713/300, 310, 320, 321, 322, 324, 325
See application file for complete search history.

(56) References Cited

U.S. PATENT DOCUMENTS

| | | | |
|---|---|---|---|
| 2004/0100310 A1 | 5/2004 | Kurakane | |
| 2009/0013199 A1 | 1/2009 | Leung | |
| 2010/0077248 A1* | 3/2010 | Wu | G06F 1/08 |
| | | | 713/500 |
| 2012/0144215 A1 | 6/2012 | Naffziger | |
| 2012/0254641 A1* | 10/2012 | Rotem | G06F 1/28 |
| | | | 713/320 |
| 2013/0191677 A1 | 7/2013 | Ziesler | |
| 2013/0198554 A1* | 8/2013 | Yang | G06F 1/324 |
| | | | 713/400 |
| 2015/0355671 A1* | 12/2015 | Coutts | G06F 1/08 |
| | | | 713/503 |

* cited by examiner

CPU POWER/ CURENT (W/A)

FIG. 5

CLOCK GATE CONTROL

FIG. 6

PLL FREQUENCY

FIG. 7

CPU VOLTAGE

FAST AND AUTONOMOUS MECHANISM FOR CPU OC PROTECTION

CROSS REFERENCE TO RELATED APPLICATIONS

This application claims priority under 35 U.S.C. § 119 from U.S. Provisional Application No. 61/942,808, entitled "Fast Autonomous Mechanism for CPU OC Protection," filed on Feb. 21, 2014, the subject matter of which is incorporated herein by reference.

TECHNICAL FIELD

The present disclosure relates generally to central processing unit (CPU), and more particularly, to CPU over current protection.

BACKGROUND

In an electric power system, overcurrent (OC) or excess current is a situation where a larger than intended electric current exists through a conductor, leading to excessive generation of heat, and the risk of fire or damage to the equipment and system failure. Possible causes for overcurrent include short circuits, excessive load, and incorrect design. Fuses, circuit breakers, temperature sensors and current limiters are commonly used protection mechanism to control the risks of overcurrent.

With the advance of semiconductor technologies and the like, the performance of Central Processing Units (CPUs) and processors used in electronic devices has been improved remarkably. For example, an operating frequency of the level of GHz has been used widely in mobile phones. When the system speed and core requirements reach higher limits, the power consumption of CPUs and processors is also increasing. Power management integrated circuits (PMICs) are integrated circuits for managing power requirements of the host system. A PMIC is often included in battery-operated devices such as mobile phones and portable media players.

When the PMIC of the host system is over loaded and the CPU activity is high, it indicates that the CPU may be facing excessive power consumption and overcurrent situation. A fast and autonomous solution for providing CPU overcurrent protection is sought.

SUMMARY

A method of detecting and preventing over current induced system failure is provided. An OC protect controller monitors a CPU total power consumption based on received CPU activity information. In response to the monitoring, if the CPU power consumption is over a threshold, then the OC protect controller outputs a frequency dithering control signal to reduce the CPU clock frequency such that the CPU does not reach an OC limit. The OC protect controller also outputs a PLL frequency control signal to reduce the PLL clock frequency to improve system efficiency.

In one embodiment, the OC protect controller invokes a two-stage mechanism to proactively detect and prevent OC-induced system failure. To prevent initial OC condition, the OC protect controller first triggers a clock-gating mechanism. It sends a frequency dither control signal to reduce the operating frequency of the CPU accordingly. In one example, the clock gating percentage is controlled to be 60%, which effectively reduces the CPU operating frequency to 60%. The clock-gating mechanism provides a minimum latency CPU operating frequency control—it has a fast response time because there is no need for PLL reconfiguration and relocking. In addition to the clock gating, the OC protect controller further controls PLL frequency and PMIC voltage to improve system efficiency. In one example, the PLL frequency is reduced to 80% and the PMIC voltage is reduced from 1V to 0.85 v. The frequency and voltage control provides improved system efficiency at the cost of higher latency.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
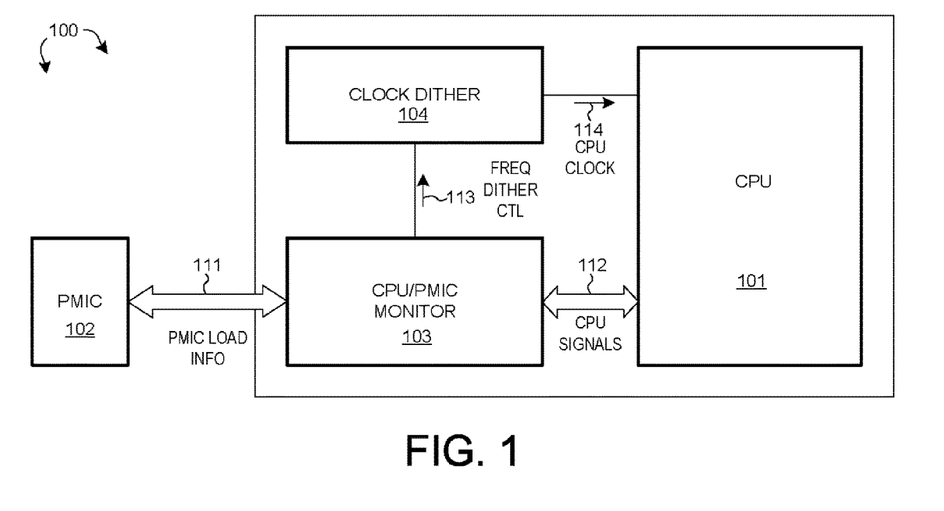
FIG. 1 illustrates an electronic device with a mechanism for CPU over-current protection in accordance with one novel aspect.

FIG. 1 illustrates an electronic device 100 with a mechanism for CPU over-current protection in accordance with one novel aspect. Electronic device 100 comprises a central processing unit (CPU) 101, a power management integrated circuit (PMIC) 102, a CPU/PMIC monitor 103, and a clock dither controller 104. PMIC 102 is an integrated circuit that manages the power requirement of the host system. When the system speed and core requirements reach higher limits under increased operating frequency, the power consumption of the CPU is also increasing. When the CPU total power consumption increases beyond the PMIC limit, it leads to system crash due to Over-Current (OC) condition. Therefore, a self-regulating loop is needed to limit the CPU total power consumption within the PMIC specification.

In accordance with one novel aspect, a CPU/PMIC monitor 103 is used to proactively monitor CPU current consumption levels, and thereby triggering the clock dither controller 104 to reduce the CPU clock to stay within the PMIC specification. The CPU/PMIC monitor 103 monitors the current sourcing levels from PMIC 102 (both absolute value and rate of increase), as depicted by arrowed line 111 for PMIC load information. The CPU/PMIC monitor 103 also monitors the CPU internal activity, as depicted by arrowed line 112 for CPU signals. Based on both input information, the CPU/PMIC monitor 103 is able to determine whether the CPU power consumption is over a threshold level. If so, then it sends a frequency dither control signal 113 to clock dither controller 104. In one example, the frequency dither control signal 113 indicates that the CPU clock frequency should be reduced to 60%. In response to the frequency dither control signal 113, the clock dither controller 104 reduces the operating frequency of the CPU accordingly and sends the CPU clock signal 114 with reduced frequency to CPU 101. In one example, the clock dithering is achieved by periodically skipping a certain number of clock cycles. In addition, the PMIC supply voltage may be reduced accordingly as well. The hardware autonomous loop ensures that CPU will not reach over-current limit. The clock dithering mechanism provides a fast and proactive method to detect and prevent OC induced system failure, and has a fast response time because there is no need for PLL reconfiguration and relocking.

Figure 2:
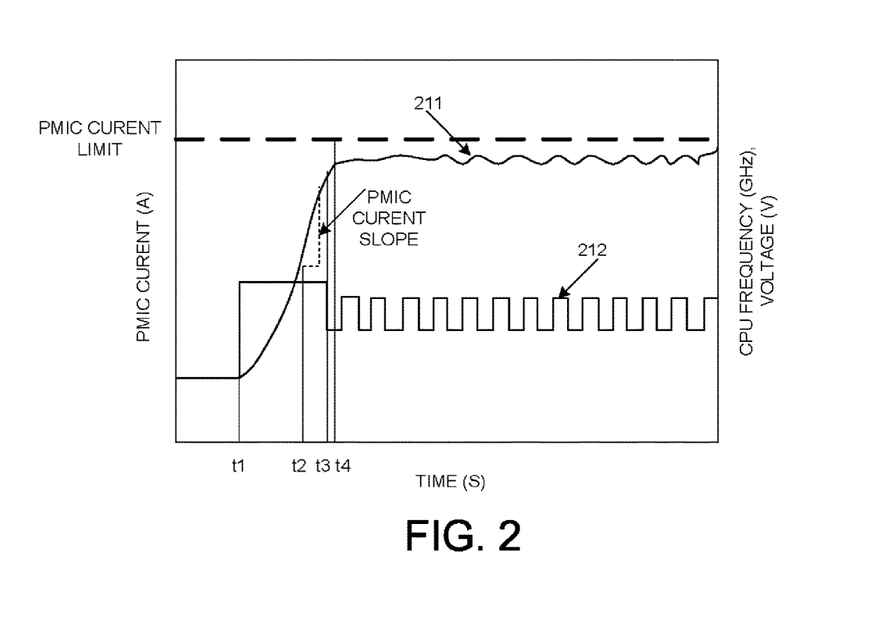
FIG. 2 illustrates a PMIC current waveform and a CPU frequency waveform with OC protection.

FIG. 2 illustrates a PMIC current waveform and a CPU frequency waveform with OC protection. In the example in FIG. 2, line 211 depicts the PMIC current (A) over time, and line 212 depicts the CPU frequency (GHz) over time. The PMIC current keeps increasing with a rapid rate after time t1. Moreover, the PMIC current is approaching its PMIC current limit at time t4. The CPU/PMIC monitor 103 in FIG. 1 monitors the absolute PMIC current value, as well as the rate of increase. The CPU/PMIC monitor then determines whether to trigger the clock dithering based on the absolute PMIC current value, the rate of increase of the PMIC current, and CPU activity. For example, from time t2 to t3, the PMIC current slope has reached a predefined threshold value. In response, the CPU/PMIC monitor triggers the clock dithering at time t3 to proactively reduce the CPU clock frequency and thus prevent potential OC condition.

Figure 3:
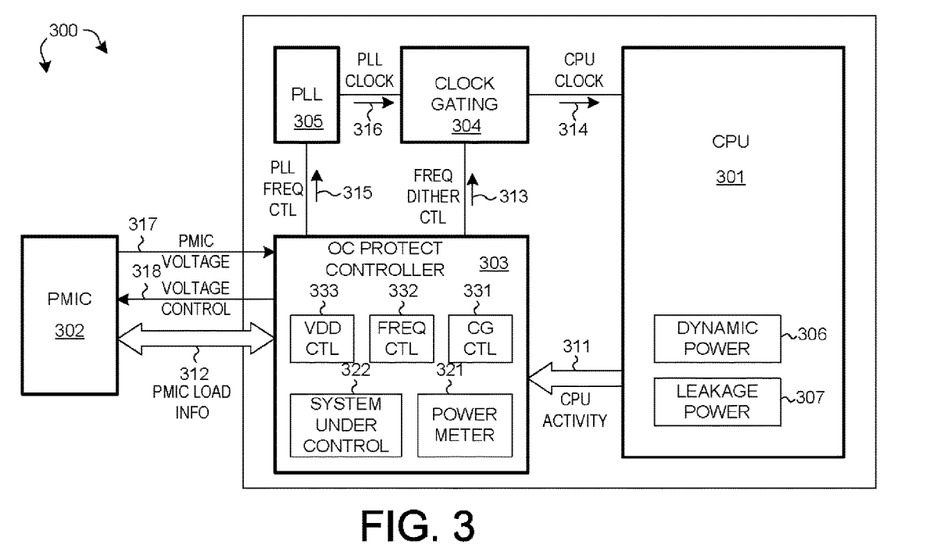
FIG. 3 illustrates one embodiment of a fast and autonomous mechanism for CPU over-current protection in accordance with one novel aspect.

FIG. 3 illustrates a preferred embodiment of a fast and autonomous mechanism for CPU over-current protection in accordance with one novel aspect. An electronic power device 300 comprises a central processing unit (CPU) 301, a power management integrated circuit (PMIC) 302, an over-current protect controller 303, a clock-gating module 304, and a Phase-Lock-Loop LLP 305. PMIC 302 is an integrated circuit that manages the power requirement of the host system. PMIC 302 may be replaced by a battery or power supply module. When the system speed and core requirements reach higher limits under increased operating frequency, the power consumption of the CPU is also increasing. For example, when electronic device 300 is engaging in one or more applications with high-demanding performance, the corresponding CPU power consumption increases rapidly. When the CPU total power consumption increases beyond the PMIC or battery limit, it leads to system crash due to Over-Current (OC) condition. Therefore, a self-regulating loop is needed to limit the CPU total power consumption within the PMIC or battery specification.

In accordance with one novel aspect, OC protect controller 303 is used to proactively monitor CPU current consumption levels, and thereby triggering the clock-gating module 304 and PLL 305 to reduce the CPU clock frequency, the PLL clock frequency, and the PMIC supply voltage to stay within the PMIC specification. OC protect controller 303 comprises a power meter 321, a system under control module 322, a clock-gating (CG) controller 331, a PLL frequency (FREQ) controller 332, and a supply voltage (VDD) controller 333. First, OC protect controller 303 monitors the CPU internal activity, as depicted by arrowed line 311 indicating CPU activity. For example, within CPU 301, there is a dynamic power monitor 306 that monitors the CPU dynamic power consumption, and a leakage power monitor 307 that monitors the CPU leakage power consumption. The total amount of CPU power consumption/activity is then output to power meter 321 of the OC protect controller. Note that such monitoring is real-time and very fast, e.g., only takes a few clock cycles. Second, OC protect controller 303 monitors the current sourcing levels from PMIC 302 (both absolute value and rate of increase), as depicted by arrowed line 312 indicating PMIC load information. Based on both input information, OC protect controller 303 is able to determine whether the CPU total power consumption is over a threshold level very quickly, e.g., within a few clock cycles.

If the CPU total power consumption is detected to be over a threshold, then it indicates a potential OC condition. The OC protect controller 303 then invokes a mechanism to proactively detect and prevent OC-induced system failure. To prevent initial OC condition, OC protect controller 303 first triggers a clock-gating mechanism. It sends a frequency dither control signal 313 from CG controller 331 to clock-gating module 304. In response to the frequency dither control signal 313, clock-gating module 304 reduces the operating frequency of the CPU accordingly and outputs the CPU clock signal 314 with reduced frequency to CPU 301. In one example, the clock gating percentage is controlled to be 60%, which effectively reduces the CPU operating frequency to 60%. The clock-gating mechanism provides a minimum latency CPU operating frequency control—it has a fast response time because there is no need for PLL reconfiguration and PLL relocking.

In addition to clock gating, OC protect controller 303 further controls PLL frequency and PMIC voltage. When the CPU total power consumption is detected to be over a threshold, the PLL frequency and the PMIC supply voltage may be reduced accordingly as well to improve system efficiency. OC protect controller 303 sends a PLL frequency control signal 315 to PLL 305 from FREQ controller 332. In one example, the PLL frequency control signal 315 controls the PLL to reduce its PLL frequency to be 80% of the original peak PLL clock frequency. PLL 305 then outputs the PLL clock signal 316 with reduced PLL frequency to clock-gating module 304. In addition, OC protect controller 303 also sends a PMIC voltage control signal 318 to PMIC 302 from VDD controller 333 such that the PMIC voltage 317 is reduced accordingly. The PMIC voltage control and PLL frequency control has higher latency as compared to the clock-gating mechanism. However, as the PLL frequency and the PMIC voltage is reduced, the clock-gating percentage is increased, e.g., from 60% initially back to 100%, and the effective CPU operating frequency is increased to 80% and thereby improving system efficiency.

Figure 4:
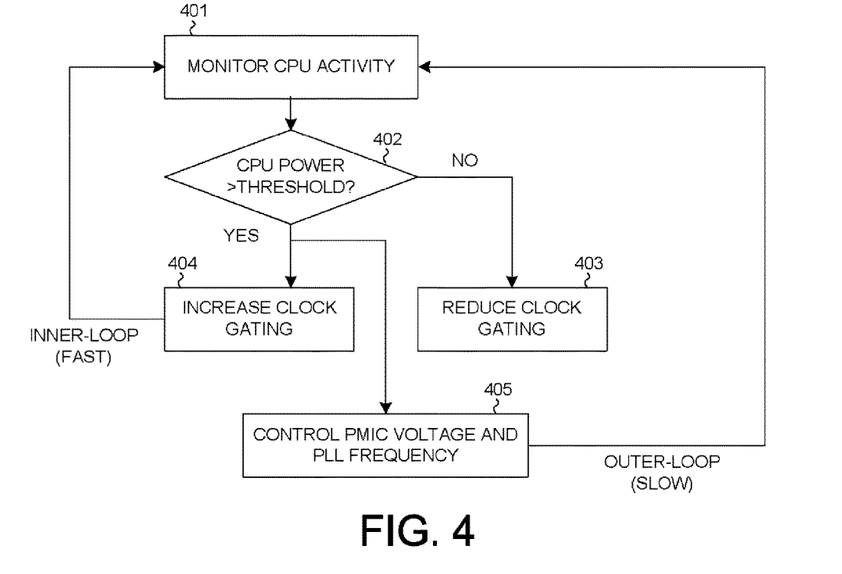
FIG. 4 is a flow chart of the OC protection mechanism in accordance with one novel aspect.

FIG. 4 is a flow chart of the above-illustrated OC protection mechanism for CPU in an electronic power system in accordance with one novel aspect. The CPU operating frequency is supplied by a PLL clock, while the CPU operating voltage is supplied by a PMIC. In step 401, an OC protect controller monitors the CPU activity that indicates the CPU total power consumption and over-current condition. In step 402, the OC protect controller detects whether the CPU total power consumption is higher than a threshold. If the answer is no, then in step 403, the OC protect controller reduces existing clock gating. If the answer is yes, then in step 404, the OC protect controller increases clock gating by dithering the CPU clock frequency to a certain percentage without altering the PLL clock. In step 405, the OC protect controller further controls the PLL clock frequency and the PMIC voltage to a reduced level. Steps 401 through 404 form an inner-loop to prevent initial OC condition, which provides a fast and proactive method to detect and prevent OC induced system failure. On the other hand, steps 401 through 405 form an outer-loop to reduce the PLL clock and PMIC voltage to improve system efficiency with higher latency.

One operation example with OC protection and frequency/voltage control is now illustrated below with accompanying drawings. In the following example, the maximum CPU power pattern is 13 W and the OC protection target CPU power is 8 W.

Figure 5:
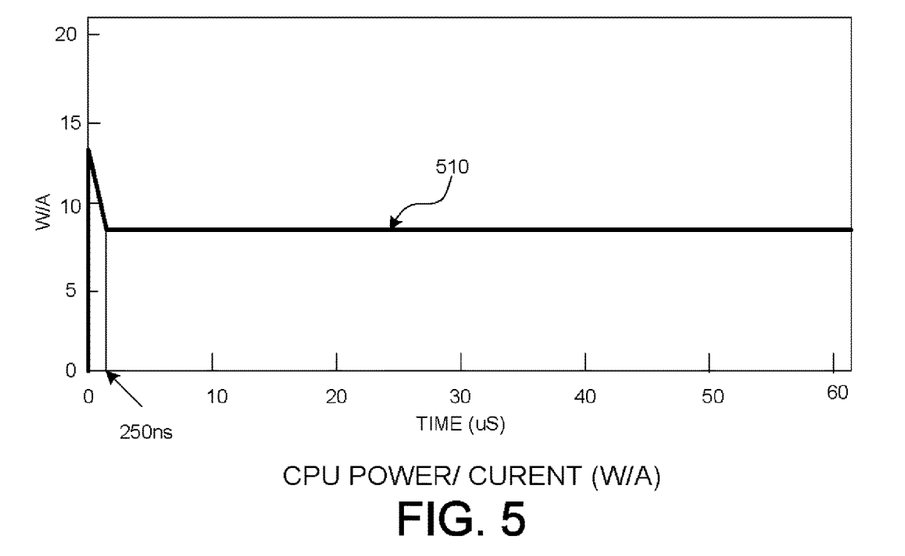
FIG. 5 illustrates an example of a CPU power waveform under OC protection.
Figure 6:
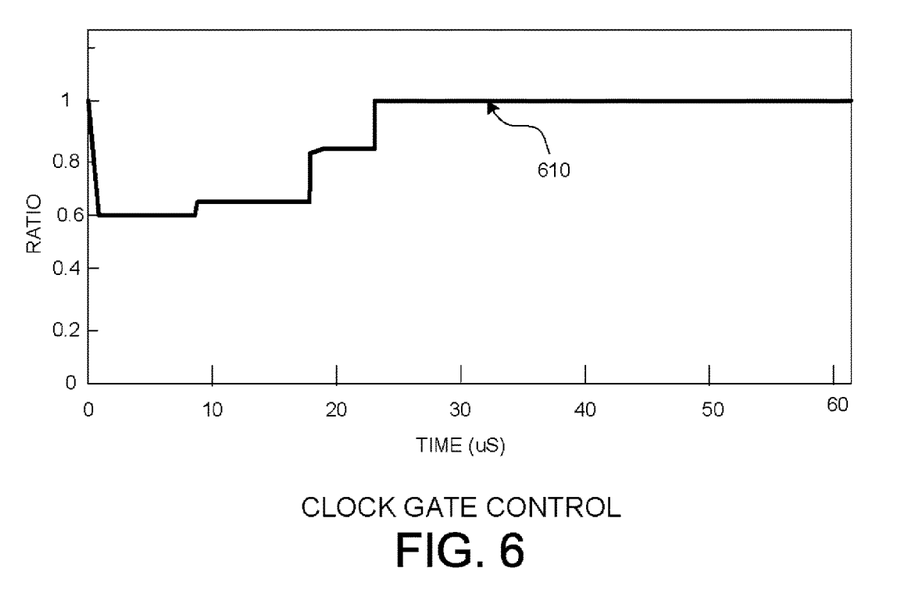
FIG. 6 illustrates an example of a clock gating control waveform under OC protection.

FIG. 5 illustrates an example of a CPU power waveform under OC protection. As depicted by line 510 in FIG. 5, the CPU power reaches 13 W initially at time 0. This high CPU power consumption is higher than the threshold, and is detected within a few clock cycles by the OC protect controller. In response, the OC protect controller triggers the clock-gating mechanism, which reduces CPU clock frequency to be 60% of the PLL clock frequency, as illustrated in FIG. 6. It can be seen that within 250 ns, the CPU power consumption is quickly controlled to be around the target 8 W using the fast-response clock gating mechanism.

FIG. 6 illustrates an example of a clock gating control waveform under OC protection. As depicted by FIG. 6, after the OC protection controller detects that the CPU power consumption is 13 W at time 0, it triggers the clock-gating mechanism almost immediately. As a result, the clock-gating controller outputs a CPU clock, which has a frequency at 60% of the original PLL clock frequency. Line 610 in FIG. 6 shows the frequency ratio of the CPU clock and the PLL clock. During the initial clock gating control, the ratio is approximately 0.6. Later on, when the PLL frequency is also controlled to a lower value, the ratio of the CPU clock and the PLL clock eventually raised back to be close to one.

Figure 7:
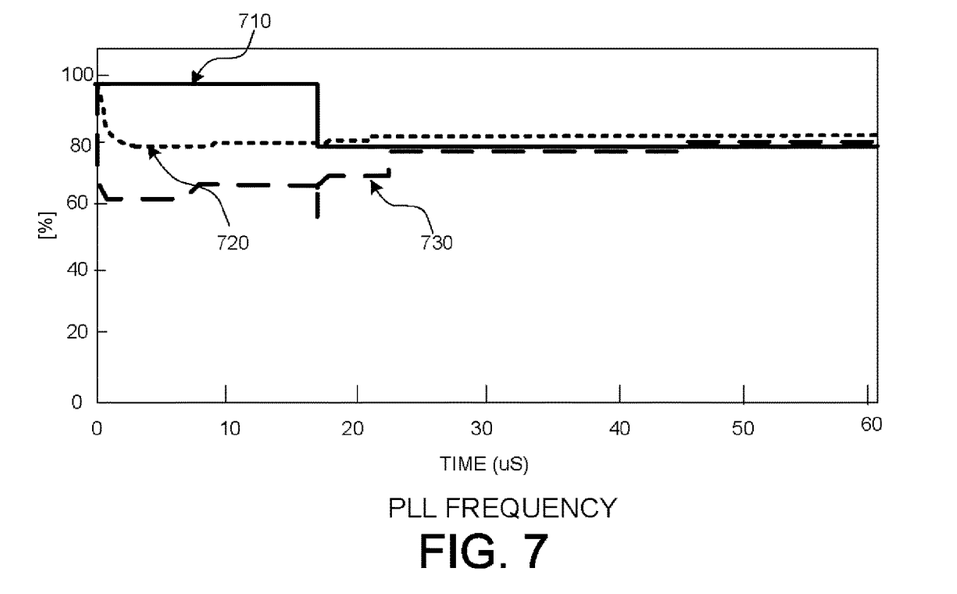
FIG. 7 illustrates an example of a PLL frequency waveform under OC protection.

FIG. 7 illustrates an example of a PLL frequency waveform under OC protection. In FIG. 7, line 710 shows the actual PLL frequency, line 720 shows the desired PLL frequency, and line 730 shows the effective PLL frequency. During the initial clock gating control, due to the CPU clock gating, the effective PLL clock is 60% of the original peak PLL frequency. The desired PLL frequency ratio is 80% of the original peak frequency, as system efficiency can be improved when the effective frequency increases. The actual PLL clock frequency, however, stays at ~100% initially because it takes time for the PLL clock to be reconfigured and relocked. After ~17 uS, the actual PLL clock frequency is reduced to 80%. Referring back to FIG. 6, at the same time the actual PLL clock frequency is reduced to 80%, the clock-gating ratio increases to ~0.8 such that the effective PLL frequency starts to increase. Later, at ~22 uS, the clock-gating ratio keeps increasing back to be one such that the effective PLL frequency eventually increases to 80%. At this point, the CPU clock is equal to the PLL clock, which is at 80% of the original peak PLL clock frequency.

Figure 8:
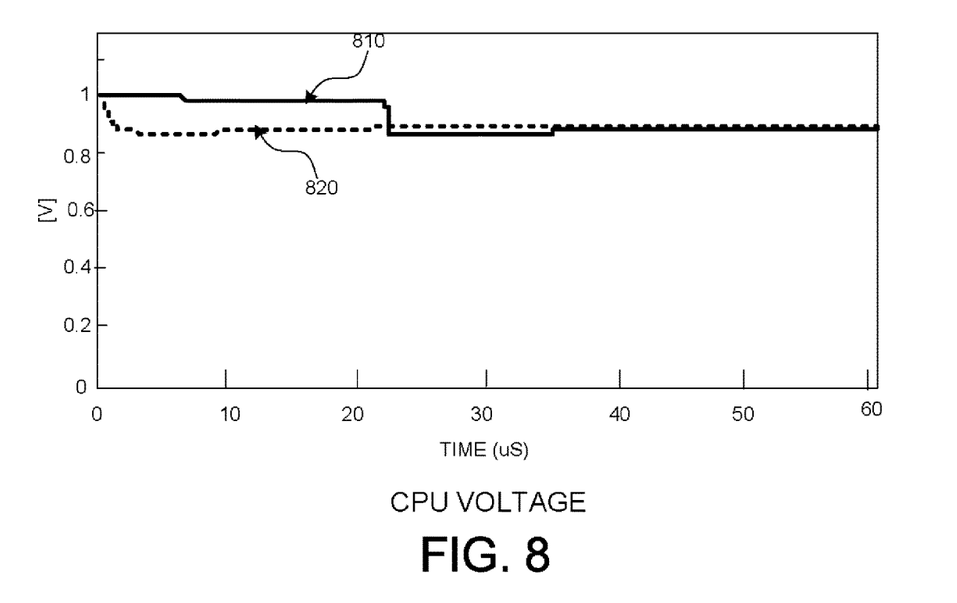
FIG. 8 illustrates an example of a CPU voltage waveform under OC protection.

FIG. 8 illustrates an example of a CPU voltage waveform under OC protection. The CPU voltages equal to the PMIC voltage supplied by the PMIC. In FIG. 8, line 810 shows the actual CPU/PMIC voltage, and line 820 shows the desired CPU/PMIC voltage. The original operating voltage is at 1V. When OC condition is detected, the desired CPU voltage is to gradually dropping to 0.85V, which is the required voltage for the corresponding operating frequency. The actual CPU voltage, however, does not change immediately. Only after the PLL clock frequency is dropped to 80%, then the PMIC can control its output supply voltage to the desired PMIC voltage of 0.85V. From the above illustration, it can be seen that with both clock gating and PLL frequency/PMIC voltage control, the effective CPU frequency is raised from 60% to 80%, CPU power is moved from leakage power to dynamic power, and system efficiency is improved.

Figure 9:
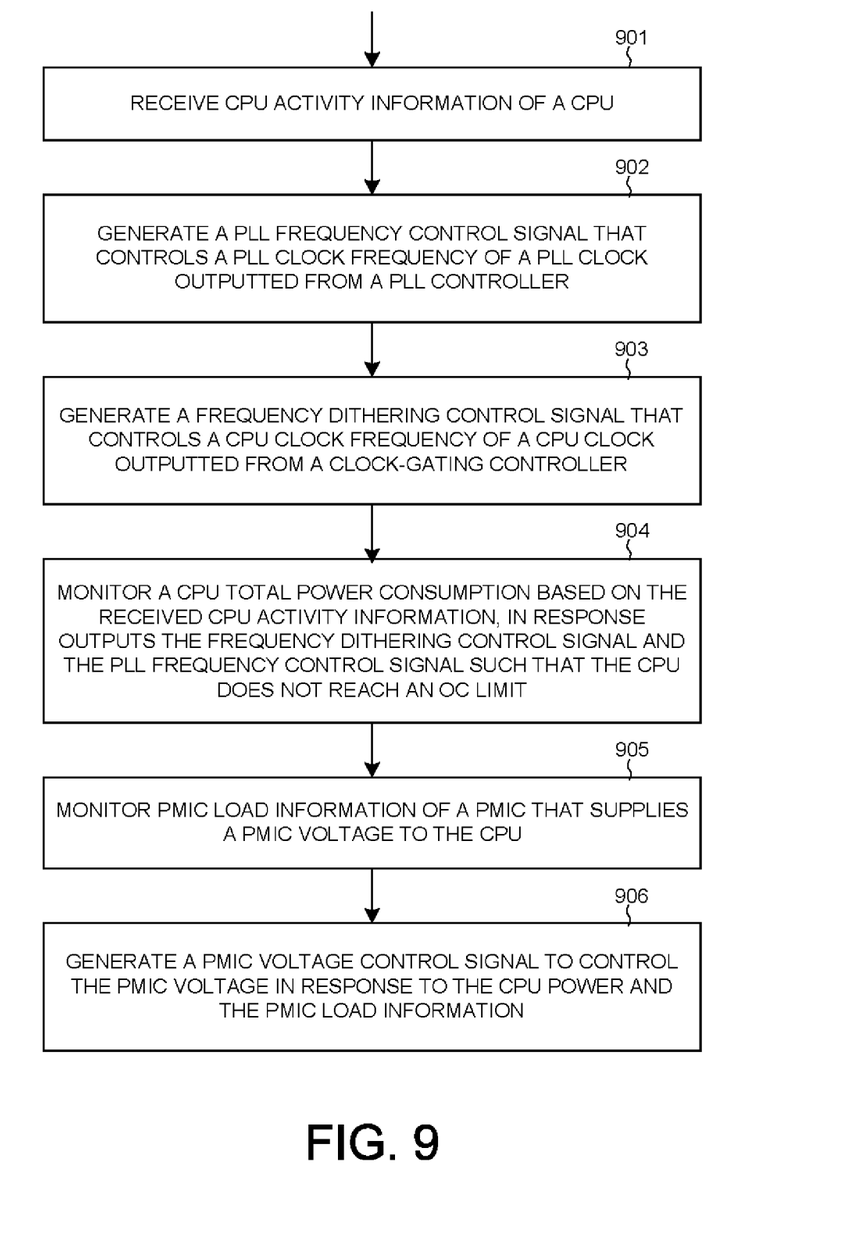
FIG. 9 is a flow chart of a method of over-current protection in accordance with one novel aspect.

FIG. 9 is a flow chart of a method of over-current protection for a CPU of an electronic power system in accordance with one novel aspect. In step 901, an OC protect controller receives CPU activity information of the CPU, which can be used to determine CPU total power consumption and over current condition. In step 902, the OC protect controller generate a PLL frequency control signal that controls a PLL clock frequency of a PLL clock signal that is outputted from a PLL. In step 903, the OC protect controller generates a frequency dithering control signal that controls a CPU clock frequency of a CPU clock signal outputted from a clock gating controller. In step 904, the OC protect controller monitors a CPU total power consumption based on the received CPU activity information. In response to the monitoring, the OC protect controller outputs the frequency dithering control signal and the PLL frequency control signal such that the CPU does not reach an OC limit. In step 905, the OC protect controller also monitors PMIC load information of a PMIC that supplies a PMIC voltage to the CPU. In step 906, the OC protect controller generates a PMIC voltage control signal to reduce the PMIC voltage while reducing the PLL frequency in response to the CPU power consumption and the PMIC load information.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. An apparatus comprising:
   a central processing unit (CPU);
   a Phase-Locked Loop (PLL) controller that receives a PLL frequency control signal, and in response outputs a PLL clock signal;
   a clock-gating controller that receives the PLL clock signal and a frequency dithering control signal, and in response outputs a CPU clock signal; and
   an over-current protection (OCP) controller that monitors a CPU total power consumption based on received CPU activity information, and wherein in response to detecting that the CPU power is above a predefined threshold while the CPU clock signal is at a first CPU clock frequency and the PLL clock signal is at a first PLL clock frequency, the OCP controller is operative to:
   output the frequency dithering control signal which reduces the first CPU clock frequency while the PLL clock signal is at the first PLL clock frequency; and
   output the PLL frequency control signal which reduces the first PLL clock frequency such that the CPU does not reach an over-current limit.

2. The apparatus of claim 1, wherein the OCP controller comprises a power meter that monitors the CPU total power consumption based on the CPU activity information.

3. The apparatus of claim 2, wherein the CPU total power consumption includes a dynamic power consumption and a leakage power consumption.

4. The apparatus of claim 1, wherein the frequency dither control signal controls the clock-gating controller to reduce a clock gating percentage by periodically skipping clock cycles to thereby reduce a ratio of a CPU clock frequency and a PLL clock frequency when the CPU power is above the predefined threshold.

5. The apparatus of claim 4, wherein the OCP controller outputs the frequency dither control signal after detecting the CPU power is above the predefined threshold for a number of CPU clock cycles.

6. The apparatus of claim 1, wherein the PLL frequency control signal controls the PLL controller to reduce a PLL clock frequency when the CPU power is above the predefined threshold.

7. The apparatus of claim 6, wherein the PLL clock frequency is reduced such that a ratio of a CPU clock frequency and the PLL clock frequency is substantially equal to one.

8. The apparatus of claim 1, further comprising: a power management integrated circuit (PMIC) that supplies a PMIC voltage to the CPU.

9. The apparatus of claim 8, wherein the OCP controller also outputs a PMIC voltage control signal to the PMIC to control the PMIC voltage in response to the CPU total power consumption and PMIC load information.

10. The apparatus of claim 9, wherein the PMIC voltage control signal controls the PMIC to reduces the PMIC voltage when the PLL clock frequency is reduced.

11. A method, comprising:
   (a) receiving central processing unit (CPU) activity information of a CPU;
   (b) generating a phase-locked loop (PLL) frequency control signal that controls a PLL clock frequency of a PLL clock outputted from a PLL controller;
   (c) generating a frequency dithering control signal that controls a CPU clock frequency of a CPU clock outputted from a clock-gating controller; and
   (d) monitoring a CPU total power consumption based on the received CPU activity information, and in response to detecting that the CPU power is above a predefined threshold while the CPU clock signal is at a first CPU clock frequency and the PLL clock signal is at a first PLL clock frequency, outputs the frequency dithering control signal which reduces the first CPU clock frequency while the PLL clock signal is at the first PLL clock frequency, and outputs the PLL frequency control signal which reduces the first PLL clock frequency such that the CPU does not reach an over-current limit.

12. The method of claim 11, wherein the monitoring in (d) involves using a power meter to monitor the CPU total power consumption based on the CPU activity information.

13. The method of claim 12, wherein the CPU total power consumption includes a dynamic power consumption and a leakage power consumption.

14. The method of claim 11, wherein the frequency dither control signal reduces a clock gating percentage by periodically skipping clock cycles to thereby reduce a ratio of the CPU clock frequency and the PLL clock frequency when the CPU power is above the predefined threshold.

15. The method of claim 14, wherein the frequency dither control signal is generated after detecting the CPU power is above the predefined threshold for a number of CPU clock cycles.

16. The method of claim 11, wherein the PLL frequency control signal reduces the PLL clock frequency when the CPU power is above the predefined threshold.

17. The method of claim 16, wherein the PLL clock frequency is reduced such that a ratio of the CPU clock frequency and the PLL clock frequency is substantially equal to one.

18. The method of claim 11, further comprising:
monitoring power management integrated circuit (PMIC) load information of a PMIC that supplies a PMIC voltage to the CPU.

19. The method of claim 18, further comprising:
generating a PMIC voltage control signal to control the PMIC voltage in response to the CPU total power consumption and the PMIC load information.

20. The method of claim 19, wherein the PMIC voltage control signal controls the PMIC to reduce the PMIC voltage when the PLL clock frequency is reduced.

* * * * *